United States Patent [19]
Royce et al.

[11] Patent Number: 5,884,083
[45] Date of Patent: Mar. 16, 1999

[54] COMPUTER SYSTEM TO COMPILE NON-INCREMENTAL COMPUTER SOURCE CODE TO EXECUTE WITHIN AN INCREMENTAL TYPE COMPUTER SYSTEM

[76] Inventors: Robert Royce, 1200 Newport Rd., Ann Arbor, Mich. 48103; Eric Zoerner, 11725 Hannewald, Munith, Mich. 49259; Claudio Nascimento, 500 Tobin Dr., Apt. #8, Inkster, Mich. 48141

[21] Appl. No.: 717,991

[22] Filed: Sep. 20, 1996

[51] Int. Cl.$^6$ .................................................. G06F 9/45
[52] U.S. Cl. .......................................... 395/705; 395/707
[58] Field of Search .................................... 395/705, 707

[56] References Cited

U.S. PATENT DOCUMENTS 5,768,564  6/1998  Andrews .................................. 395/500

OTHER PUBLICATIONS

Johnson, Jay "Java as an Application Development Language", Object Magazine, v6 n4 p. 59(2), Jun. 1996.

*Primary Examiner*—Tariq R. Hafiz
*Assistant Examiner*—Lisa Stevens
*Attorney, Agent, or Firm*—Chupa and Alberti, P.C.

[57] ABSTRACT

A computer system which receives non-incremental computer source code which is created and generated from a non-incremental computer system and which places the received non-incremental source code in a parse tree arrangement, thereby enabling the received source code to be developed, compiled, and/or executed with an incremental computer and to be selectively and communicatively exported to a non-incremental computer system.

12 Claims, 1 Drawing Sheet

COMPUTER SYSTEM TO COMPILE NON-INCREMENTAL COMPUTER SOURCE CODE TO EXECUTE WITHIN AN INCREMENTAL TYPE COMPUTER SYSTEM

BACKGROUND OF THE INVENTION

1. Field of the Invention

This invention relates to a technique encompassing a methodology and an apparatus for allowing non-incremental computer source code to be compiled and to operate within an incremental type of computer system. In one embodiment, the technique of this invention allows Java® type computer source code to be compiled and made to operate within a Smalltalk™ type computer system.

2. Discussion

Incremental computer systems, such as those which utilize the conventional and known Smalltalk™ software programming language, are widely known and used within the computer industry. At the outset it should be realized that the terms "system" and/or "computer system" as used in this Application mean the cooperative combination of software and/or hardware and/or firmware which cooperatively and functionally allow a software program to be developed and to executed in order to achieve its various certain objectives. Moreover, as used in this Application, the term incremental language is meant to refer to a language which is utilized by a computer system which allows individual subroutines (e.g. methods, procedures, and/or functions) to be compiled and/or modified while the program is executing and/or running. A non-incremental language refers to a language which is utilized by a computer system which requires the computer program to be stopped from executing before subroutines are modified and/or compiled.

These incremental types of computer systems are favored, by many software developers and programmers, over non-incremental computer systems since they allow for method level compilations under which single methods or portions of the developed computer program may be sequentially and singularly compiled, run, modified, and/or analyzed. This allows the software methodology or program to be changed on a method by method basis, thereby allowing the programmer and/or software developer greater control over and greater flexibility in programming. These incremental software development systems also allow the program behavior to be modified while the program is operating or "running". These features, as are known to those of ordinary skill in the computer programming art, allow for enhanced error analysis of the programming code since one may inspect the various objects and data within a program as that program is executing or "running" instead of stopping the program. Moreover, these features also allow one to evaluate the software program's response (or the response of part of the program) to arbitrary expressions, such as the known "do-it" type expressions, thereby allowing a software program developer to evaluate the program's response to a known and/or preselected set of inputs or to different modifications, thereby increasing and/or enhancing program development efficiency as well as facilitating error analysis. These incremental program features also reduce overall compiler and/or development time since methods and/or program portions may be compiled separately and the program need not be "restarted" every time a change occurs to the program's source code such as, without limitation, for testing purposes. Hence, these incremental types of computer systems allow relatively effective incremental compilation, interactive and/or dynamic "debugging", and program browsing capabilities.

While these known incremental software programming languages and/or systems have many advantages, they are not as widely used as are many of the non-incremental systems, perhaps due to the fact that the non-incremental programming languages and/or non-incremental computer systems pre-date the incremental systems and that these two systems are so different that relatively few of the non-incremental program developers desire to so drastically change the type of computer system that they employ to develop computer programs. Accordingly, non-incremental software programming languages and/or non-incremental types of computer systems, such as Java®, are widely used in many applications, such as and without limitation, Internet access. Moreover, such non-incremental systems usually require less memory and have relatively fast execution speed. In particular, Java® type systems have many advantages for use in a networked environment including, but not limited to, a byte code checking algorithm which allows for secure execution within a receiving computer and reduces the probability of viral destruction, and enhanced means for representing a graphical user interface in a platform independent manner. Accordingly, there exist some inherent advantages to the use of a non-incremental system and particularly a Java® type system. Therefore, each of the incremental and non-incremental systems, such as the Java® type system, has some unique advantages, depending upon the type of computer application program which is being developed. However, because there is such a great dissimilarity between these two computer systems there is and has been no motivation on the part of those skilled in the art to actually combine these systems. Applicants have recognized the utility in combining these systems as more fully explained in this Application and particularly have recognized the utility of including Smalltalk™ and Java® system features.

There is therefore a need, as Applicants have recognized, for a computer system which allows and receives software programs developed and/or written by means of one or more non-incremental software languages and which contains the characteristics and advantages of the incremental computer systems. There is further a need for an integrated software development environment which is substantially similar to an incremental development environment and which may be used to create and/or develop non-incremental computer source code. Applicants' invention(s) address these needs but should not construed as being limited in this manner. Rather, as more fully set forth below, Applicants have found that combining the advantages of each of these dissimilar computer development systems (incremental and non-incremental development systems) yields surprising, innovative, and unexpected results and advantages over the prior art. These results allow for relatively efficient software creation and/or development.

SUMMARY OF THE INVENTION

It is a first object of the invention to provide a computer system which allows software programs to be created and developed by use of at least one non-incremental computer language and which allows the created and developed software program to execute and be modified within an incremental system.

It is a second object of the invention to provide a computer system which allows software programs to be created and developed by use of at least one non-incremental computer language and to be compiled in a manner which allows the created program to execute within an incremental system.

It is a third object of the invention to provide a computer system which allows software programs to be created and developed by use of the Java® programming language and which further allows the created and/or developed Java® programs to become Smalltalk™ compiled methods.

It is a fourth object of the invention to provide a computer system which combines the advantages of both incremental and non-incremental systems, such as, without limitation, by allowing source code to be developed in an incremental system and delivered in a manner which benefits from the advantages for a non-incremental system.

According to one aspect of the present invention, first means is provided for creating a software program by use of a non-incremental programming language. Second means is also provided, which is communicatively coupled to the first means, for converting the created software program into methods associated with incremental programs, effective to allow the created software program to execute as an incremental software program.

According to a second aspect of the present invention, a method is provided which comprises the steps of creating source code by use of a non-incremental software development system; receiving the created source code; modifying the received source code to an incremental language type code, formatting the received and modified source code within a certain parse tree structure; and executing the received and modified source code on an incremental computer system.

Further objects, features, and advantages of the present invention will become apparent from a consideration of the following description and the appended claims when taken in conjunction with the accompanying drawings.

BRIEF DESCRIPTION OF THE DRAWINGS

For a fuller and more complete understanding of the nature and objects of the present invention, reference should now be had to the following in which.

DETAILED DESCRIPTION OF THE INVENTION

Figure 1:
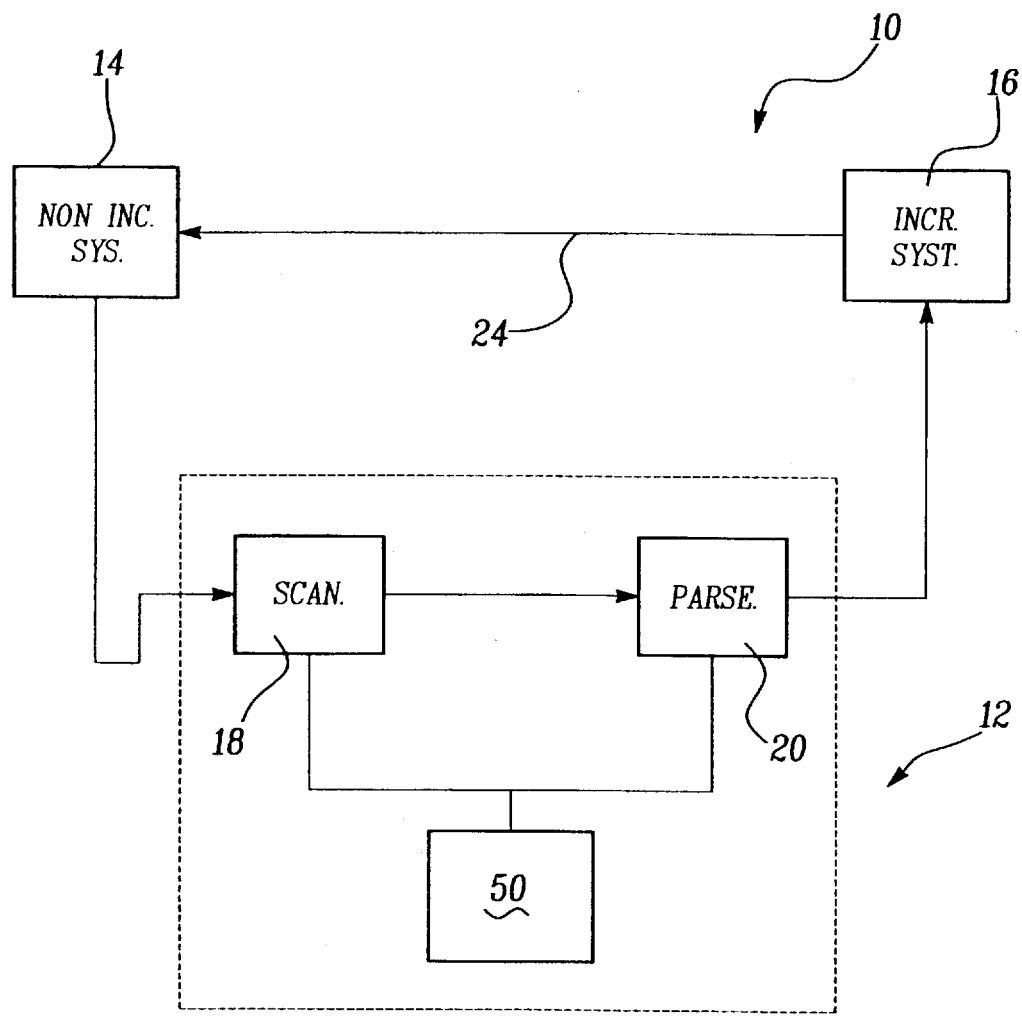
FIG. 1 is a block diagram a computer system embodying the principles of the preferred embodiment of the invention.

Referring now to FIG. 1 there is shown a computer software program development and/or creation system 10 embodying the principles of the preferred embodiment of the invention. Specifically, computer system 10 includes a computer system 12 which is made in accordance with the preferred embodiment of the invention and which is adapted to receive developed and/or created non-incremental type computer source code, such as without limitation Java® source code, which is developed and/or created by use of a commercially available and conventional non-incremental computer system 14, such as and without limitation, one of the many Java® computer systems produced and commercially available from SUN Microsystems of California, to allow the received source code to be developed and/or modified and/or executed by means of an incremental system 16 and to be exported and/or communicatively coupled to non-incremental computer system 14 as shown schematically by communication channel 24. It should be realized that channel 24 schematically illustrates the exporting of developed source code from system 16 to system 14 and that the actual export may be facillitated by one or more disks or other storage mediums without the need for an actual communications channel 24.

As is further shown in FIG. 1, system 12 of the preferred embodiment of the invention is adapted to produce incremental type computer source code, such as without limitation, Smalltalk™ type compiled methods, which may be input and which may be executed on and/or within a conventional and commercially available Smalltalk™ type computer system 16 such as the system known as Visualworks® which is produced and provided by ParcPlace-Digitalk of San Jose, Calif. At the outset, it should be realized that in the current embodiment, parser 20 comprises a LALR(1) type of parser as discussed in the text entitled *Compiler Construction*, for example on page 173 therein, authored by Mr. William M. Waite and Mr. Gerhard Goos, published by the Springer-Verlag publishing company, in 1983, Library of Congress Number QA 76.6.W3195, 1983, which is fully and completely incorporated herein by reference, paragraph by paragraph and word for word. Applicants' utilize a LALR(1) parser, within this disclosed embodiment, since, by way of example and without limitation, it is known to those of ordinary skill in the art, that *The Java Language Specification*, which was written by Mr. James Gosling, Mr. Bill Joy, and Mr. Guy Steele, which was published by Addison-Wesley in 1996, and which is fully and completely incorporated herein by reference, word for word and paragraph for paragraph, defines its language in terms of a LALR(1) grammar. This parser, as explained, produces a parse tree which is accepted by an incremental compiler, such as without limitation, a Smalltalk™ compiler. It should be apparent to one of ordinary skill in the art that while computer system 12 of the preferred embodiment of the invention receives Java® type computer source code and generates and/or outputs Smalltalk™ type compiled methods, the principles of the invention are applicable to a computer system that receives computer source code from relatively any non-incremental computer system, such as systems employing the Java® programming language, and which generates and/or outputs computer compiled code which may be used on relatively any incremental computer system, such as and without limitation, those computer systems which utilize the Smalltalk™ programming language. Moreover, as shown computer system 10 further includes a conventional scanner 18 which receives the non-incremental source code from system 14 and couples the received code to parser 20, whose operation will be discussed. Both scanner 18 and parser 20 are communicatively coupled to systems 14 and 16. Moreover, both scanner 18 and parser 20 operate under the control of a programmable computer processor 50 which, in one embodiment, comprises the processor of the incremental system 16.

While more fully explained below, one of ordinary skill in the software programming art will appreciate that computer system 12, made in accordance with the teachings of the preferred embodiment of the invention, allows a computer software program to be developed and/or created by use of a non-incremental software programming language or within an incremental type of computer system, thereby allowing the computer software program to be developed, "run", modified, and/or "executed" in the incremental system. In this manner, Applicants have combined the advantages of both the incremental and non-incremental systems, and formed a new and novel singular computer software development system 10.

To fully understand the principles underlying Applicants' invention, it must first be realized that Applicants' invention, as embodied within computer system 12, does not simply change or convert the code from one programming language to another. Applicants' have found that this approach results in a loss of functionality, rather, Applicants have discovered that, in order for the received non-incremental type source code to be usable within the incremental system, the received non-incremental computer source code must not only be changed and/or modified to the incremental language but must be additionally stored and arranged in a certain incremental system format, corresponding to Smalltalk™ methods in one embodiment, in order for the desired principles and/or objects of the invention to be achieved, and certain new functionality must be added to the received source code, over that available in the non-incremental language, in order to address the functional differences between the two distinct and dissimilar computer systems. In the preferred embodiment of the invention, the modified non-incremental (e.g. Java®) scanner 18 and the incremental (e.g. Smalltalk™) parser 20 perform this conversion, functionality addition, and parse tree or code format arrangements. The structure and operation of the unmodified scanner and parser are known to those of ordinary skill in the computer programming art and are delineated, for example, in the publicly available text or book entitled *The Java Language Specification* which was written by Mr. James Gosling, Mr. Bill Joy, and Mr. Guy Steele, which was published by Addison-Wesley in 1996, and which is fully and completely incorporated herein by reference, word for word and paragraph for paragraph.

The following discussion describes the techniques used by Applicants in creating computer system 12 and which have been found to be necessary to fulfill the previously stated objects of the invention. At the outset it must be appreciated that the non-incremental programming languages, such as the Java® programming language, differ from incremental programming languages, such as the Smalltalk™ programming language. For example, in Java® all names that reference methods, types, and fields must be defined in the system at the time a method is compiled. To allow Java® to be compiled incrementally, reference checking of such similar names are deferred as necessary until runtime, on demand by the developer, or just before execution in the delivery environment. As a second example, the Java® language allows method names to be overloaded and also requires the determination of the number and types of parameters to determine overall "runtime" method binding. Applicants have found that this behavior may be implemented by first, within the Smalltalk™ language, embedding the parameter type names into message selectors. For example, the method invocation of aString.regionMatches (true,0,"some string",0,5) is parsed as if it were the Smalltalk™ message-send in the following manner:

---
aString regionMatches.boolean:true
int:0
string: 'some string'
int:0
int:5
---

In the same manner, a method is assigned a selector that embeds the parameter type that it accepts. This allows the Smalltalk™ virtual machine to handle most of the method invocations directly. In the cases or situations where the parameter types of the method invocation do not exactly match the parameter types of the available methods, then a second technique is utilized by the computer system 12 of the preferred embodiment of the invention. That is, during compilation or "compile time", the parser 18 will check all method invocations for the existence of any method invocation ambiguities. If the ambiguity remains unresolved, a "compile time error" occurs. Specifically, to handle method lookup at and/or during run-time, a "doesNotUnderstand: method" for Java® classes as represented in the Smalltalk™ system is implemented that has a method lookup algorithm to match a method invocation with the most compatible method signature. If a suitable method is not found or if there are multiple and maximally specific methods, the method invocation is deemed to be ambiguous and a run-time-error occurs.

It is known that Smalltalk™ numbers do not have size limitations based upon "type" but that Java® numbers do. Correct Java® behavior requires, as Applicants have found, that Java® primitive types are implemented in Smalltalk™ in such a way as to emulate the overflow behavior that Java® primitive types exhibit. Applicants have found that one approach to ensure that this technique is correctly implemented is to implement substantially all of the integer mathematical operations with special methods that take size as an additional parameter. For example and without limitation, according to the teachings of the preferred embodiment of the invention, when the "+" operator is used with integral types, the "+" operator is parsed to send the message #JavaPlus:size: with a byte size parameter that is appropriate for the types of operands (e.g. ints are size 4, longs are size 8). The result of the "message send" operation will be appropriately truncated to the given or specified number of bytes that are specified by the byte size parameter. Applicants have found that floating point types of operations do not require this technique since the Smalltalk™ "Float" operations always answer a "Float", and "Double" operations always answer a "Double" and are thus already limited in size in Smalltalk™. The Java® "Float" and "Double" operations are substantially identical to that found in the Smalltalk™ system. Moreover, parser 20, as will be appreciated by one of ordinary skill in the art, will constantly check for parameter type compatibility in substantially all method invocations and arithmetic operators and will enforce accessibility tags or commands, such as and without limitation, "private", "protected", and "public" modifiers in order to substantially ensure the correct compilation of a Java® method. This "type checking" and "accessibility determination", in one embodiment of the invention, is done by parser 20 during compilation.

In the preferred embodiment of the invention, static type methods are implemented as Smalltalk™ class methods and static variables are implemented as Smalltalk™ class variables. Static variables cannot be implemented as class instance variables since Java® allows subclasses to have static variables with the same name as static variables in superclasses and are considered different variables with potentially different types. Furthermore, it is undesirable and inappropriate to have class instance variables inherited to subclasses in Smalltalk™ when they are not so inherited in Java®. In Smalltalk™ the scope of a class variable would normally extend to subclasses and subclasses are not permitted to define class variables with the same name as class variables defined in superclasses. These constraints can be overridden by the parser in this Java® system, forceably allowing subclasses to have class variables with the same name as class variables defined in superclasses. The parser handles the correct scoping and accessibility of these class members.

Furthermore, in the preferred embodiment of the invention, instance variables, default values, initializers, and static initializers are implemented by special methods which are called when an instance is created or a class is imported as appropriate. In the preferred embodiment of the invention, during instance creation, the instance creation method first instantiates the object using the #new message, in the usual and conventional Smalltalk™ manner. Next, a default value is assigned to each instance variable as appropriate for each of the types of variables. Thirdly, any initializer expressions are executed for each instance variable. Lastly, the appropriate constructor method, including any associated arguments, is selected and executed. When a class is imported, either by compiling source files or binary loading as is known and supported within a Smalltalk™ implementation, a class is created and compiled in the usual manner within Smalltalk™. Secondly, any and all initializer expressions for all static variables are executed. Lastly, any static initializers for all of the classes are executed.

Exception handling, in the preferred embodiment of the invention, is implemented by using the Smalltalk™ exception handling mechanism. A class instance variable is defined on the Java® Throwable class. Each subclass stores a Signal instance and this class instance variable will be used by the parser to generate #handle:do message-sends and #raise message sends to this signal when the parser encounters "try" statements and "throw" statements. Moreover, the Signal instance in each subclass of Throwable is a child signal of the superclass of the Throwable sub-class. The parser generates code to access the Signal as if it were a static method invocation expression. Operators are implemented with conventional and known Smalltalk™ methods written to implement the behavior as mandated in the Java® Language Specification which has been previously incorporated by reference.

Smalltalk™ compilers disallow assignment to a parameter within a method. The Java® language allows this type of assignment. Applicants have discovered that this behavior may be achieved by transforming the method parse node so that it will be accepted by the Smalltalk™ compiler. The parser tracks the parameters that are being assigned to. After the method node is complete, the parse tree is rebuilt by adding a new temporary variable for each parameter that is being assigned to, inserting a statement at the beginning of the method that does an assignment from the parameter to the new temporary variable. A global replacement of all references to the parameter with the new temporary variable is then done. Synchronized statements and methods are implemented using a Smalltalk™ mutual exclusion semaphore.

In the preferred embodiment of the invention, the following additions are made to the Java® grammar to facilitate compilation from within a code browser that displays a single method, constructor, or class definition at a time, or from a text editor for evaluation of arbitrary Java® expressions:

Method:
    ConstructorDeclaration
    MethodDeclaration
DoIt:
    ImportDeclarationsopt BlockStatementsopt Expressionopt
BlockStatements:
    BlockStatement
    BlockStatements BlockStatement
ClassDefinition:
    ImportDeclarationsopt Modifiersopt class Identifier Superopt
    Interfacesopt ClassDefinitionBody
ClassDefinitionBody:
    { ClassDefinitionBodyDeclarationsopt }

-continued

ClassDefinitionBodyDeclarations:
    ClassDefinitionBodyDeclaration
    ClassDefinitionBodyDeclarations
    ClassDefinitionBodyDeclaration
ClassDefinitionBodyDeclaration:
    FieldDeclaration
    StaticInitializer Additionally, there are some enhancements for the Java® grammar to support communication between Java® and Smalltalk™. This provides the ability for developers of this system to write code that accesses the Smalltalk™ class library for diagnostic and implementation purposes. Note that the word "smalltalk" is a new reserved word for Java® as enhanced by the computer system of the preferred embodiment of the invention.

StatementExpression:
    Smalltalk Expression
Expression:
    SmalltalkExpression
SmalltalkExpression.
    smalltalk    SmalltalkBlock
SmalltalkBlock:
    <standard Smalltalk ™ block syntax for a block with zero
    arguments>
ClassOrInterfaceType:
    smalltalk    SmalltalkClassType
SmalltalkClassType:
    name In the preferred embodiment of the invention, sample parse nodes for an LALR(1) parser are generated for input to a Smalltalk™ compiler are provided. The production rules are substantially taken from the Java® language specification, although exceptions should be noted below. Following the production rule is a schematic for the resulting parse node which, as will be understood by one of ordinary skill in the art, is written in Smalltalk™ type pseudo-code. It is assumed, for purposes of the following description, that the parse node for a production rule is left on a stack which is maintained by the parser. The notation used here utilizes names from the production rules to denote parse nodes that are left on the stack as part of the parsing process. Where alternatives are noted, such as NamelPrimaryNoNewArray, this is an abbreviated way of denoting that either the "Name" parse node is used or the "PrimaryNoNewArray" parse node is used, depending upon which part of the production rule was actually parsed, thereby determining what parse node was left on the stack.

Method:
    ConstructionDeclaration
    MethodDeclaration
    [MethodNode
        body: (BlockNode new body: ConstructorBody\MethodBody)
        arguments: FormalParameterList
        selector: (self makeSelectorFrom: Identifier
        andArgs: FormalParameterList)}

The parse nodes which are denoted as ConstructorBody, MethodBody, FormalParameterList and Identifier refer to parse nodes which are left on the stack as part of the parsing of ConstructorDeclaration or MethodDeclaration, which includes ConstructorBody, MethodBody, FormalParameterList, and Identifier as part of their own individual production rules as defined in the Java® Language Specification. Also note that the #makeSelectorFrom:andArgs: method is a supporting method in the parser that constructs a message selector from the method name and the types of the arguments.

```
DoIt:
    BlockStatementsopt Expressionopt
        [MethodNode new
            selector: #DoIt
            block: (BlockNode new
                arguments: #()
                body: (SequenceNode new statements:
                    (BlockStatements
                        copyWith:Expression) ) ) ]
```

The copyWith: message refers to an operation that appends the argument, here the Expression parse node, to the receiver which is a collection of parse nodes, here BlockStatements.

```
IfThenStatement:
    if (Expression) Statement
        [MessageNode new
            receiver: Expression
            selector: #ifTrue:
            argument: (BlockNode new body: Statement) ]
IfThenElseStatement:
    if (Expression) StatemenNoShortIf else Statement
        [MessageNode new
            receiver: Expression
            selector: #ifTrue:ifFalse:
            arguments: (Array with:
                    (BlockNode new
                        body: StatementNoShortIf)
                    with:
                    (BlockNode new
                        body: Statement) ]
SwitchStatement:
    switch (Expression) SwitchBlock
        [MessageNode new
            receiver: Expression
            argument: SwitchBlocks]
```

In the preferred embodiment of the invention, the #switch: method is a method added to the classes that implement the Java® primitive types char,byte,short and int which implements the Switch logic. SwitchBlock puts a parse node on the stack that will cause the creation of any Array of Associations at runtime of keys of type char,byte, short or int, and values of the associated switch statement results.

```
WhileStatement:
    while (Expression) Statement
        [MessageNode new
            receiver: (BlockNode new body: Expression)
            selector: #whileTrue:
            argument: (BlockNode new body: Statement)
DoStatement:
    do Statement while (Expression):
        [MessageNode new
            receiver: (BlockNode new
                body: (Statement copyWith: Expression) )
            selector: #whileTrue
            arguments: # ( )]
ForStatement:
    for (ForInitopt; Expressionopt; ForUpdateopt) Statement
        [SequenceNode new
            statements: (ForInit copyWith:
                (MessageNode new
                    receiver: (BlockNode new body: Expression)
                    selector: #whileTrue:
                    argument: (BlockNode new
```

```
                    body: (SequenceNode
                        statements: Statement) ) ) ]
ReturnStatement:
    return Expressionopt;
        [ReturnNode new value: Expression]
FieldAccess:
    Primary . Identifier
    super . Identifier
        [MessageNode new
            argument: (builder newLiteralValue: Identifier)
            selector: #atField:
            receiver: Primary|super ]
```

In the preferred embodiment of the invention, the #atField: method is a new method added to Java® classes that access an instance variable by name. The parser handles accessibility constraints and duplication of field names within the superclass chain.

```
MethodInvocation:
    Name (ArgumentListopt)
    Primary . Identifier (ArgumentListopt)
    super . Identifter (ArgumentListopt)
        [MessageNode new
            receiver: self|Primary|super
            selector: self makeSelectorFrom: Name\Identifier
                            andArgs: ArgumentList
            arguments: ArgumentList]
```

In the preferred embodiment of the invention, the #makeSelectorFrom:andArgs: method is a supporting method in the parser that constructs a message selector from the method name and the types of the arguments. ArrayAccess:

```
ArrayAccess:
    Name [Expression ]
    PrimaryNoNewArray [ Expression ]
        [MessageNode new
            argument: Expression
            selector: #at:
            receiver: Name\PrimaiyNoNewArray]
ArrayCreationExpression:
    new PrimitiveType DimExprs Dimsopt
    new ClassOrInterfacType DimExprs Dimsopt
        [MessageNode
            receiver: (VariableNode new name: #JavaArray)
            selector: #newOfType:dims:isFinal:
            arguments: (Array with:
                (PrimitiveType\ClassOrInterfaceType)
                with:
                (self dynamicArrayCreationNodeWith: DimExprs)
                with: (LiteralNode new value: Dims size=0) ]
```

In the preferred embodiment of the invention, first, the parser creates a MessageNode that sends the message #newOfType:dims:isFinal: to the class JavaArray. This method will create an array of the appropriate type and dimensions. The isFinal paramenter is true if there are no empty dims ([ ]) so the basic element types of the array are created and stored in the array. If the isFinal parameter is false, then there were at least one set of empty dims, so the basic element types are not created and stored in the array.

Second, the method #dynamicArrayCreationNodeWith: answers a parse node that will cause a Smalltalk™ Array to be created at runtime that contains the values of the expression nodes that were passed as parameters to the #dynamicArrayCreationNodeWith: method.

```
Assignment:
    LeftHandSide
    AssignmentOperator
    AssignmentExpression
            [AssignmentNode new
                variable: LeftHandSide
                value: (MessageNode new
                    receiver: LeftHandSide
                    selector: AssignmentOperator
                    argument: AssignmentExpression) ]
```

In the preferred embodiment of the invention, if the LeftHandSide is a field access or array access expression, then instead of creating an assignment node, the parser, in this context of assignment, changes the field access message from #fieldAt: to #fieldAt:put:, or the array access message from #at: to #at:put:.

```
ConditionalExpression:
    ConditionalOrExpression
    ConditionalOrExpression
            ? Expression : ConditionalExpression
    [MessageNode new
        receiver: (BlockNode new
                        body: ConditionalOrExpression)
        selector: #ifTrue:ifFalse:
        arguments: (Array with: Expression
                          with: ConditionalExpression)
```

These techniques can also be used or employed to create interactive development environments with incremental compilation for non-incremental languages other than Java®, such as for and without limitation, the known and commercially available C, C++, and Pascal languages. Data structures that are not "objects" in other languages can be implemented in Smalltalk™ as objects. For example, Applicants have found that a C/C++ struct can be created as a Smalltalk™ object that stores the data that would otherwise be stored in the structure. Function calls that are not associated with a class can be implemented as class methods within a Smalltalk™ class designated to handle global functions.

Thus, as described in the foregoing discussion, computer system 12 of the preferred embodiment of the invention receives source code from a non-incremental computer system, recognizes the functionality which must be added in order to allow corresponding actions to be taken in the incremental computer system, parses the received source code, creates a parse tree so that the received source code may be compiled by an incremental computer system, develops/modifies the compiled code, and outputs and/or exports the formatted code to a non-incremental system. Applicants, in this manner, have provided a computer system in which software programs may be developed by use of a non-incremental computer system and yet modified/developed and/or executed or "run" on an incremental system and exported or communicated back to a non-incremental computer system. These non-incrementally developed software programs may also be modified and/or "debugged" on a method basis, as is an inherent incremental system characteristic. Applicants' system therefore combines the advantages and features of both dissimilar systems.

It is to be understood that the invention is not limited to the exact construction or method illustrated and described above, but that various changes and modifications may be made without departing from the spirit and the scope of the invention as defined in the following claims.

We claim:

1. A computer system comprising a non-incremental computer system which is effective to generate computer source code; a scanner and parser arrangement, communicatively coupled to the non-incremental computer system, effective to receive said generated computer source code and for arranging said received generated computer source code in a certain parse tree arrangement and for outputting said received generated computer source code in said parse tree arrangement; and an incremental computer system, communicatively coupled to said scanner and parser arrangement, for receiving said generated and arranged computer source code in said certain format and for executing the same.

2. The computer system of claim 1 wherein said incremental computer system comprises a Smalltalk™ computer system.

3. The computer system of claim 1 wherein said non-incremental computer system comprises a Java® computer system.

4. A computer system which is adapted to receive computer source code from a non-incremental computer system and to generate incremental computer source code written in an incremental computer language: said non-incremental source code having a plurality of parameter type names, integer size limitations, and static type methods, said system comprising: first means to receive said non-incremental computer source code;

second means, communicatively coupled to said first means, for arranging said received non-incremental source code into a certain parse tree arrangement and for embedding said parameter type names contained in said non-incremental source code into message selectors in said incremental source code, for recognizing said integer size limitations and for embedding substantially all of said size limitations contained in said non-incremental source code into separate incremental methods in said incremental source code, and for implementing substantially all of said static methods contained in said non-incremental source code as incremental class variables in said incremental source code; and, third means for outputting said incremental source code.

5. The computer system of claim 4 wherein said non-incremental computer source code comprise Java® source code.

6. The computer system of claim 4 wherein said incremental source code comprise Smalltalk™ source code.

7. A method of allowing computer source code generated from a first non-incremental computer system to be executed within an incremental computer system, comprising the steps of receiving said source code from said non-incremental computer system; formatting said received source code in a certain manner; outputting said formatted source code to said incremental computer system; and executing said formatted source code within said incremental computer system.

8. The method of claim 7 wherein said computer source code generated from said non-incremental computer comprises a plurality of parameter type names, said method further comprising the step of embedding said parameter type names into message selectors within said incremental source code.

9. The method of claim 7 wherein said computer source code generated from said non-incremental computer comprises a plurality of integer size limitations, said method further comprising the steps of recognizing said integer size limitations and for embedding substantially all of said integer size limitations with separate incremental methods within said incremental source code.

10. The method of claim 7 wherein said computer source code generated from said non-incremental computer comprises a plurality of static variables, said method further comprising the step of implementing each of said static variables as class variables.

11. The method of claim 7 wherein said non-incremental computer system comprises a Java® system.

12. The method of claim 7 wherein said incremental computer system comprises a Smalltalk™ system.

\* \* \* \* \*